(No Model.)
J. T. GOODE.
SWEEP.
No. 382,522. Patented May 8, 1888.
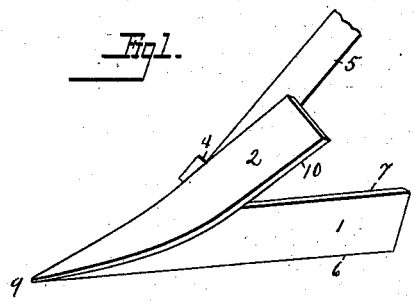
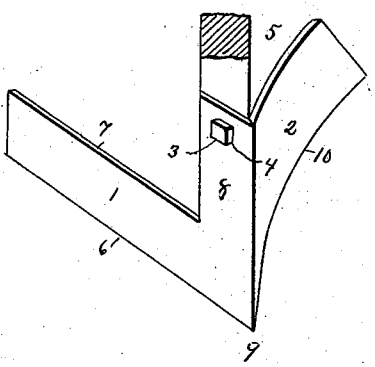
Attest:
Wm. H. H. Knight,
A. E. Hansmann.
Inventor:
Joseph T. Goode.
Foster & Freeman,
Attys.
N. PETERS, Photo-Lithographer, Washington, D. C.

UNITED STATES PATENT OFFICE.

JOSEPH TERRELL GOODE, OF POINT PETER, GEORGIA.

SWEEP.

SPECIFICATION forming part of Letters Patent No. 382,522, dated May 8, 1888.

Application filed August 20, 1886. Renewed December 27, 1887. Serial No. 259,143. (No model.)

*To all whom it may concern:*

Be it known that I, JOSEPH TERRELL GOODE, a citizen of the United States, and a resident of Point Peter, Oglethorpe county, Georgia, have invented certain new and useful Improvements in Barring-Off Sweeps, of which the following is a specification.

My invention relates to improvements in plows of that particular class designed for use in the cultivation of corn or cotton plants, and has for its objects the provision of a combined turning-blade and corn or cotton sweep adapted while being moved forward between the rows of plants to clear or cut away weeds, &c., from the surface of the ground therebetween, and at the same time to "hill" or throw earth to the middle of such rows.

The invention further contemplates the provision of an implement of the class named, which shall combine simplicity of construction and adjustment, durability, and cheapness of manufacture.

To these ends the invention consists in a device constructed substantially as hereinafter specifically set forth, and illustrated in the accompanying drawings, wherein similar figures of reference denote similar parts.

In said drawings, Figure 1 represents a side elevation of a device embodying my invention in position for operation, and Fig. 2 is a plan view thereof.

In the cultivation of corn, cotton, or analogous plants it has been found necessary to employ special implements for the purpose of clearing the surface of the ground between rows of such plants of weeds, &c., and for "hilling" or throwing earth to the middle of such rows to cover the roots of the plants, such special implements being necessitated by the decided difference existing between such operations, in the one instance requiring that the implement be moved forward parallel or nearly parallel with the surface of the ground without entering or digging into the surface thereof, to cut or clear the weeds, &c., therefrom, and in the other instance requiring that the implement enter the surface of the ground for the purpose of hilling or throwing earth to the middle of the rows to cover the roots of the plants, as well as for the purpose of covering or plowing under the weeds or other trash. To the above ends I form a corn or cotton sweep, 1, and a turning-blade, 2, integral with each other, and provide such implement with an aperture, 3, adapted to receive a bolt, 4, whereby it is secured in position to a plow-boot, 5. I provide that the body of the turning-blade 2 when in position for operation shall extend or be inclined rearwardly from the plow-boot at the proper curvature and angle to properly fulfill its functions.

The sweep 1 extends laterally and rearwardly from the blade 2, at such an angle therewith as shall bring its lower sharpened or cutting edge 6 parallel or nearly parallel with the surface of the ground when the implement is in use.

I preferably make the body of the sweep narrow, and provide the same with a straight upper edge, 7, parallel with the cutting-edge, so that weeds, &c., when cut shall pass up the front surface of the sweep, which action is facilitated by the angle at which said surface extends with relation to the surface of the ground, and over the upper edge, 7, to the ground in rear of the implement.

For the purpose of imparting increased rigidity and strength to the implement, as well as to increase the bearing-surface of such implement at the point at which it is secured to the plow-boot, I provide the sweep-blade 1, above its junction with the turning-blade, with a projecting portion, 8, through which projection I preferably form the securing-aperture 3, as shown. If desired, however, said aperture may be formed near the point of the implement, or two or more securing-apertures may be formed through the blade at points best adapted to hold the blade securely to the plow-boot.

In operation the point 9 enters the ground to a sufficient depth, and is moved forward therein, the cutting-edge 6 of the sweep passing lightly over the surface of the ground, cutting weeds, &c., therefrom, while the surface and edge 10 of the turning-blade 2 covers or throws earth to the middle of the rows around and above the stalks and roots of the plants.

The blade herein described may be secured to any desired form of plow beam and boot or stock, and may be formed or stamped from a single sheet of metal, or the turning-blade and sweep may be separately formed and thereafter welded together, or said implement may be of metal cast in a single piece, each of which methods of construction will produce an implement containing the principal feature of my invention, to wit: a blade comprising in a single piece two separate implements—a turning-blade and a sweep.

I am aware that plows have been made combining a turning-blade or wing, and an opposite scraping-wing; but my plow has a special construction of scraper, the blade being low and narrow, whereby it cuts the weeds and allows them to fall over the blade to the rear.

I claim—

In combination with a plow stock, a cultivating implement having a turning-blade, 2, adapted to enter the soil, a narrow straight sweep-blade, 1, projecting on the side of the stock opposite to the turning-blade, and arranged to scrape the surface of the ground, and the strengthening-piece 8, carried by one of the blades and bearing against the stock, substantially as described.

In testimony whereof I have signed my name to this specification in the presence of two subscribing witnesses.

JOSEPH TERRELL GOODE.

Witnesses:
M. F. BURT,
L. SCHEVENELL.